United States Patent

Oishi et al.

[19]

[11] 4,348,029

[45] Sep. 7, 1982

[54] SEAL-RING TYPE SHAFT-SEALING DEVICE

[75] Inventors: Norio Oishi; Toshinari Shimazu, both of Kobe; Takuya Suganami; Takahiro Masuda, both of Amagasaki, all of Japan

[73] Assignee: Mitsubishi Denki Kabushiki Kaisha, Tokyo, Japan

[21] Appl. No.: 285,097

[22] PCT Filed: Jan. 16, 1981

[86] PCT No.: PCT/JP81/00011
§ 371 Date: Jul. 22, 1981
§ 102(e) Date: Jul. 22, 1981

[87] PCT Pub. No.: WO81/02051
PCT Pub. Date: Jul. 23, 1981

[30] Foreign Application Priority Data

Jan. 17, 1980 [JP] Japan ................................. 55-4213

[51] Int. Cl.³ ............................................. F16J 15/40
[52] U.S. Cl. ......................................... 277/26; 277/27; 277/70; 277/173
[58] Field of Search ............. 277/3, 27, 26, 70, 74–76, 277/173–176, 217

[56] References Cited

U.S. PATENT DOCUMENTS

| 2,971,783 | 2/1961 | Laser | 277/26 |
| 3,132,906 | 5/1964 | Sternlicht | 277/3 X |
| 3,528,666 | 9/1970 | Prampart | 277/70 X |
| 3,756,673 | 9/1973 | Strub | 277/27 X |

FOREIGN PATENT DOCUMENTS

| 591055 | 1/1960 | Canada | 277/74 |
| 240856 | 11/1911 | Fed. Rep. of Germany | 277/175 |
| 933698 | 1/1948 | France | 277/217 |
| 212348 | 4/1967 | Sweden | 277/75 |
| 2042098A | 9/1980 | United Kingdom | 277/26 |

OTHER PUBLICATIONS

"High-Performance Seals", by Cawley et al., Machine Design, Apr. 1, 1971.
"Mating Materials and Environment Combinations for Specific Contact-and Clearance Type Seals", by Ruthenberg, ASLE Lubrication Engineering, vol. 29, Feb. 1973.
"The Influence of High Pressure Oil Seals on Turbo-Rotor Stability", by Kirk et al., ASLE Lubrication Engineering, vol. 22.

Primary Examiner—Robert S. Ward, Jr.
Attorney, Agent, or Firm—Oblon, Fisher, Spivak, McClelland & Maier

[57] ABSTRACT

A seal-ring type shaft-sealing device for sealing a highly pressurized fluid such as gas and liquid has a seal ring whose inner circumference is previously formed ovally and is held so as to incline the longitudinal axis of the ellipse to the gravity force direction in the revolutional direction of the rotating shaft at an angle smaller than 90° thus improving the floating characteristic and eliminating the irregular distribution in temperature during operation. The device can be used, for example, in a turbine generator.

1 Claim, 4 Drawing Figures 4,348,029

SEAL-RING TYPE SHAFT-SEALING DEVICE

FIELD OF TECHNOLOGY

The present invention relates to a seal-ring structure of a seal-ring type shaft-sealing device which improves the floating characteristic and eliminates the non-uniformity in temperature during the operation.

BACKGROUND OF TECHNOLOGY

FIGS. 1 and 2 show the conventional seal-ring type shaft-sealing device for sealing a fluid such as a highly pressurized gas or liquid.

In the figures, the reference numeral (1) designates a rotating shaft; (2) designates a housing having side walls (2a), (2b) through which the rotating shaft (1) passes; (3) designates a seal ring formed by a pair of annular rings; (4) designates an antirotation pin secured to the seal ring (3) to prevent it rotation; (5) designates inlets for a sealing liquid which are provided radially in the outer surface of the seal ring at plural positions in order to seal a highly pressurized fluid, the inlets communicating with a single annular groove (6); (7) designates a gap formed between the seal ring and the rotating shaft (1); (8) designates an antirotation pin support formed in the housing (2); and (9) designates a annular space for feeding the sealing liquid radially which is also formed in the housing (2).

Operation of the conventional device having the structure described above will be explained.

The sealing liquid in the housing (2) passes through the inlets (5) of the seal ring (3) to fill the annular groove (6) and provides a liquid film (not shown in the figures) in the gap (7) formed between the rotating shaft (1) and the seal ring (3) and flows, on the one hand, to the sealed side (shown by the symbol G) and on the other hand, to a low pressure side as atmosphere (shown by the symbol A). The pressure (PS) of the sealing liquid is maintained slightly higher than the pressure PG of the fluid to be sealed (gas or liquid) whereby leakage of the fluid to be sealed to the lower pressure side is prevented. The seal ring (3), during operation, floats by hydrodynamic force, producing the liquid film, by the revolution of the rotating shaft (1) so that the seal ring operates in a non-contacting state, i.e. maintaining a gap (7) between itself and the rotating shaft (1).

In the conventional shaft-sealing device, the inner circumference of the seal ring (3) is manufactured a true circle while the seal ring generally operates eccentrically in relation to the rotating shaft (1) as shown by dotted lines in FIG. 3 whereby heat produced in the liquid film formed in the gap (7) by the revolution of the rotating shaft (1) is not uniformly distributed on the inner surface of the seal ring and the seal ring becomes oval shaped by thermal deformation as shown by the solid line in the figure. The minimum liquid film thickness (F) existed in non-thermal deformation is further reduced to the thickness (H) as shown in FIG. 3. This results in an excessive temperature increase in the inner surface of the seal ring (3) and contact with the rotating shaft (1) thereby having an adverse effect on the vibration of the shaft.

SUMMARY OF THE INVENTION

It is an object of the present invention to overcome the disadvantages of the conventional device and to provide a seal-ring type shaft-sealing device which provides a uniform temperature distribution in the inner surface of the seal ring by producing previously the inner circle of the seal ring in a predetermined oval shape and by fitting the seal ring into a housing in an inclined state so that the angle formed by the longitudinal axis of the ellipse and the gravity force direction of the seal ring in the revolutional direction of the rotating shaft is smaller than 90° and which attains an excellent shaft-sealing function by reducing the difference between the maximum thicknesses of the liquid film produced between the seal ring and the rotating shaft.

In accordance with the present invention, a seal-ring type shaft-sealing device which provides a uniform temperature distribution in the inner surface of the seal ring by producing previously the inner circle of the seal ring in a predetermined oval shape and by fitting the seal ring into a housing in an inclined state so that an angle formed by the longitudinal axis of the ellipse and the gravity force direction of the seal ring in the revolutional direction of the rotating shaft is smaller than 90° and which attains an excellent shaft-sealing function by reducing the difference between the maximum and minimum thickness of the liquid film produced between the seal ring and the rotating shaft, is provided.

THE BEST EMBODIMENT OF THE INVENTION

Figure 1:
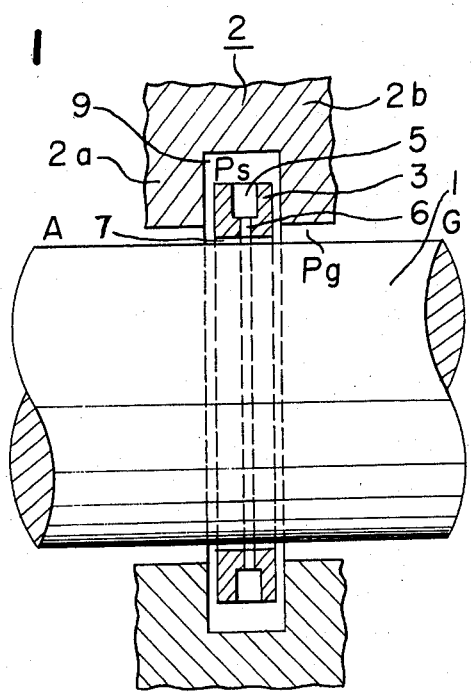
FIG. 1 is a sectional view of the conventional seal-ring type shaft-sealing device.
Figure 2:
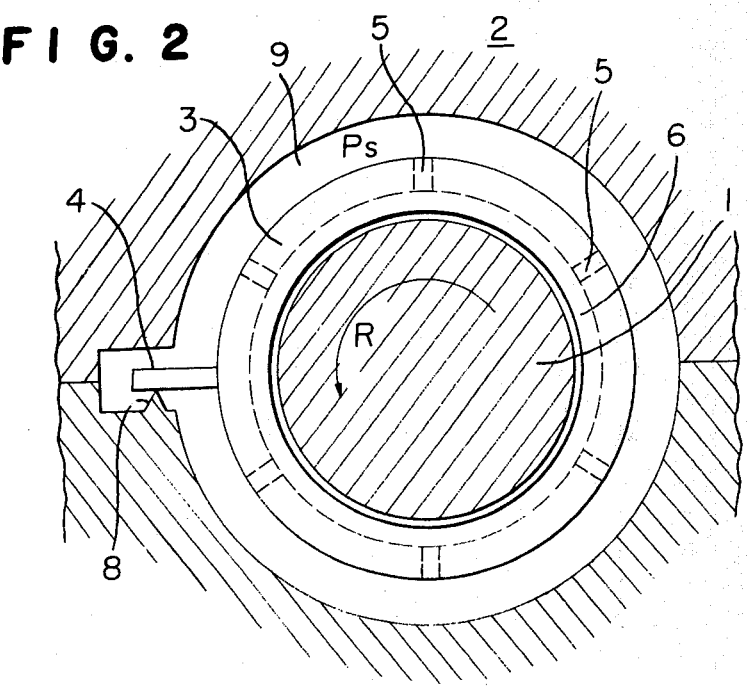
FIG. 2 is a sectional view taken along line II—II of FIG. 1.
Figure 3:
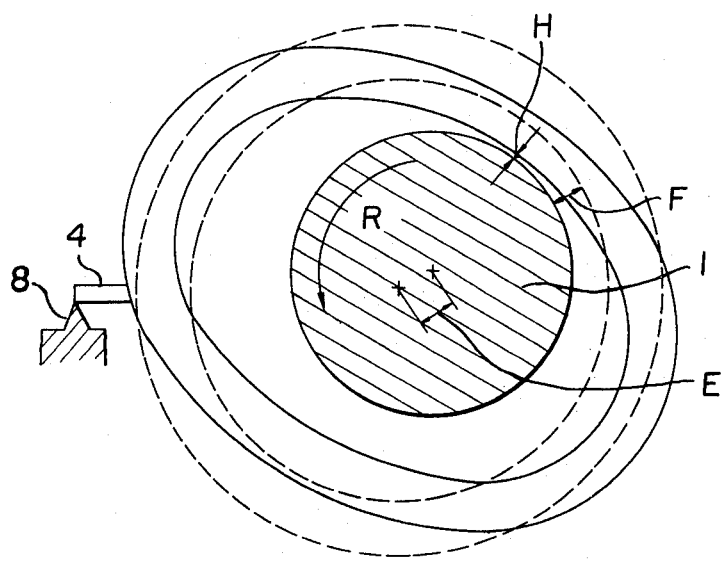
FIG. 3 is a sectional view for illustrating the operation of the seal ring of the conventional shaft-sealing device.

The structure of an embodiment of the shaft-sealing device of the present invention will be described with reference to FIG. 4.

In the figure, the structures of a rotating shaft (1), a housing (2), an antirotation pin (4), an inlet for sealing liquid (5), an annular groove (6), an antirotation pin support (8) and a annular feeding space (9) are the same as those of the conventional ones and the description is omitted. The reference numeral (11) designates an oval-shaped seal ring mounted around the rotating shaft (1) within the housing (2) so as to incline the longitudinal axis direction L of the ellipse to the gravity force direction W of the seal ring in the revolutional direction R by an angle $\theta$.

The operation of the shaft-sealing device of the present invention which has a structure described above will be explained.

Figure 4:
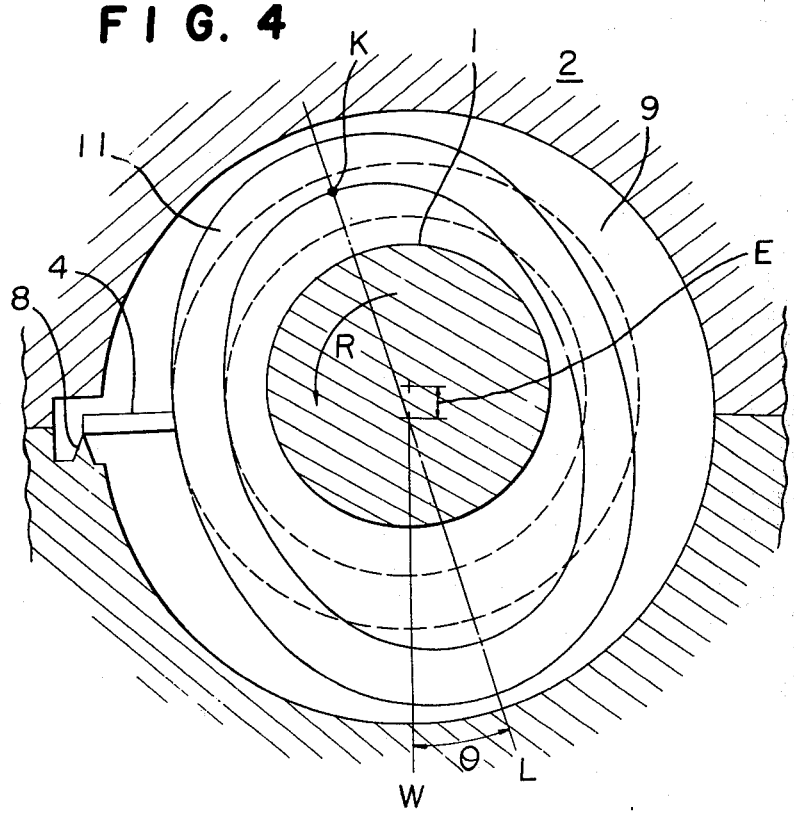
FIG. 4 is a sectional view showing the operation of an embodiment of the seal ring of a seal-ring type shaft-sealing device of the present invention.

In FIG. 4, the oval seal ring (11) is held within the housing (2) so that the angle formed by the longitudinal axis L of the ellipse and the gravity force direction W of the seal ring in the revolutional direction R of the rotating shaft (1) is a suitable angle $\theta$ smaller than 90°.

Frictional heat is produced in the liquid film on the inner surface of the seal ring (11) by the revolution of the rotating shaft (1). Since the seal ring (11) operates with an eccentricity E in relation to the rotating shaft (1), temperature distribution on the inner surface of the seal ring becomes irregular due to the frictional heat and the portion at the point K in the drawing is most heated. Accordingly, a thermal deformation of the seal ring (11) occurs by the irregular distribution in temperature so as to provide a truly circular seal ring as shown by a dotted line in the drawing.

Change in shape of the seal ring from that shown by the solid line to that shown by the dotted line causes a uniform distribution in thickness of the liquid film on the inner surface of the seal ring in a circumferential direction, thus a uniform temperature of the inner surface of the seal ring is attained; hence, smooth sealing performance can be obtained.

In the embodiment described above, the entire shape of the seal ring (11) is oval. The same effect can be obtained by shaping only the inner part of the seal ring ovally.

INDUSTRIAL APPLICABILITY

The present invention can be applied to the sealing of a part in which the shaft of an apparatus such as a turbine generator filled with a highly pressurized gas extends from the wall of the apparatus.

We claim:

1. In a seal-ring type shaft-sealing device comprising an annular seal ring held in housing and fitted loosely around a rotating shaft passing through the side walls of said housing in which said seal ring is rendered in a floating state upon said rotating shaft by sealing liquid forced into said housing, an improvement characterized in that the inner circumference of said annular seal ring is substantially oval and is held in an inclined state so that the angle formed by the longitudinal axis of the ellipse and the gravity force direction of said seal ring in the revolutional direction of said rotating shaft is smaller than 90°.

* * * * *